US011915697B2

(12) United States Patent
Oh et al.

(10) Patent No.: US 11,915,697 B2
(45) Date of Patent: Feb. 27, 2024

(54) ELECTRONIC DEVICE, SYSTEM AND CONTROL METHOD THEREOF

(71) Applicant: SAMSUNG ELECTRONICS CO., LTD., Suwon-Si (KR)

(72) Inventors: Hyungrai Oh, Suwon-si (KR); Jongyoub Ryu, Suwon-si (KR); Seonghan Ryu, Suwon-si (KR); Eunji Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 267 days.

(21) Appl. No.: 17/436,442

(22) PCT Filed: Jun. 3, 2021

(86) PCT No.: PCT/KR2021/006973
§ 371 (c)(1),
(2) Date: Sep. 3, 2021

(87) PCT Pub. No.: WO2022/102893
PCT Pub. Date: May 19, 2022

(65) Prior Publication Data
US 2022/0351723 A1 Nov. 3, 2022

(30) Foreign Application Priority Data

Nov. 11, 2020 (KR) .................. 10-2020-0150340
Feb. 1, 2021 (KR) .................. 10-2021-0014058

(51) Int. Cl.
*G10L 15/22* (2006.01)
*G10L 15/18* (2013.01)

(52) U.S. Cl.
CPC .......... *G10L 15/22* (2013.01); *G10L 15/1815* (2013.01); *G10L 2015/223* (2013.01); *G10L 2015/228* (2013.01)

(58) Field of Classification Search
CPC .......... G10L 15/22; G10L 15/00; G10L 15/01; G10L 15/06; G10L 15/063; G10L 15/08;
(Continued)

(56) References Cited

U.S. PATENT DOCUMENTS 7,606,708 B2  10/2009 Hwang
9,953,648 B2   4/2018 Choi et al.
(Continued)

FOREIGN PATENT DOCUMENTS

KR  10-2006-0088512  8/2006
KR  10-2016-0132748  11/2016
(Continued)

OTHER PUBLICATIONS

International Search Report and Written Opinion dated Sep. 17, 2021 in corresponding International Application No. PCT/KR2021/006973.
(Continued)

*Primary Examiner* — Qi Han
(74) *Attorney, Agent, or Firm* — Nixon & Vanderhye, P.C.

(57) ABSTRACT

Disclosed are an electronic device, a system, and a controlling method thereof. The controlling method includes: receiving an input utterance, determining whether domain information and intent information are able to be extracted by analyzing the input utterance, based on at least one of the domain information and the intent information not being extracted, broadcasting a signal requesting previous utterance related information to one or more external devices connected to a same network as the electronic device, receiving the previous utterance related information from the at least one external device, extracting the domain information and the intent information based on the received previous utterance related information and the input utter-
(Continued)

ance, and obtaining and outputting a response result based on the extracted domain information and intent information.

15 Claims, 13 Drawing Sheets

(58) Field of Classification Search
CPC . G10L 15/18; G10L 15/1815; G10L 15/1822; G10L 15/183; G10L 15/20; G10L 15/26; G10L 2015/0631–0638; G10L 2015/221–228
USPC .... 704/270.1, 270, 272, 275, 257, 231, 243, 704/245, 250, 255
See application file for complete search history.

(56) References Cited

U.S. PATENT DOCUMENTS

| | | | |
|---|---|---|---|
| 10,546,583 B2* | 1/2020 | White | G10L 15/28 |
| 10,884,096 B2 | 1/2021 | Baek et al. | |
| 11,145,303 B2 | 10/2021 | Kwon | |
| 11,367,434 B2 | 6/2022 | Lee et al. | |
| 2006/0173686 A1 | 8/2006 | Hwang | |
| 2016/0336024 A1 | 11/2016 | Choi et al. | |
| 2017/0025124 A1* | 1/2017 | Mixter | G10L 15/22 |
| 2017/0076720 A1* | 3/2017 | Gopalan | G10L 15/22 |
| 2018/0233147 A1 | 8/2018 | Tukka et al. | |
| 2018/0247645 A1 | 8/2018 | Li et al. | |
| 2019/0304450 A1 | 10/2019 | Kwon | |
| 2020/0074993 A1 | 3/2020 | Lee et al. | |
| 2020/0111497 A1 | 4/2020 | Littlejohn | |
| 2020/0126565 A1 | 4/2020 | Kim et al. | |
| 2020/0135212 A1 | 4/2020 | Cho et al. | |
| 2020/0294503 A1 | 9/2020 | Ryu et al. | |
| 2020/0349940 A1 | 11/2020 | Ko et al. | |
| 2021/0097989 A1 | 4/2021 | Lee et al. | |

FOREIGN PATENT DOCUMENTS

| | | |
|---|---|---|
| KR | 10-2018-0071931 | 6/2018 |
| KR | 10-2019-0014569 | 2/2019 |
| KR | 10-1972545 | 4/2019 |
| KR | 10-2019-0114321 | 10/2019 |
| KR | 10-2019-0118995 | 10/2019 |
| KR | 10-2020-0047311 | 5/2020 |
| KR | 10-2020-0052804 | 5/2020 |
| KR | 10-2020-0109954 | 9/2020 |
| WO | 2018/213415 | 11/2018 |

OTHER PUBLICATIONS

Supplementary Extended European Search Report dated Oct. 23, 2023 issued in European Patent Application No. 21892063.5.

* cited by examiner

FIG. 7B

| DOMAIN CLASSIFIER | INTENT CLASSIFIER | DIALOGUE STATE (LISTENER) | DECISION |
|---|---|---|---|
| REJECT | – | IDLE, TASK COMPLETE | REJECT |
| REJECT | – | PROMPT | ACCEPT |
| ACCEPT | REJECT | IDLE, TASK COMPLETE | REJECT |
| ACCEPT | REJECT | PROMPT | ACCEPT |
| ACCEPT | ACCEPT | IDLE, TASK COMPLETE | ACCEPT |

FIG. 9B

| DEVICE CLASSIFIER (ROOT) | DEVICE CLASSIFIER (CONTINUATION CLASSIFIER) | DIALOGUE STATE (LATEST DIALOGUE STATE OF OTHER DEVICE) | DECISION |
|---|---|---|---|
| - | - | PROMPT | ACCEPT |
| REJECT | ACCEPT | TASK COMPLETE | ACCEPT |
| ACCEPT | REJECT | IDLE | ACCEPT |
| ACCEPT | ACCEPT | TASK COMPLETE | ACCEPT (CONTINUATION) |
| ACCEPT | ACCEPT | IDLE | ACCEPT (ROOT) |

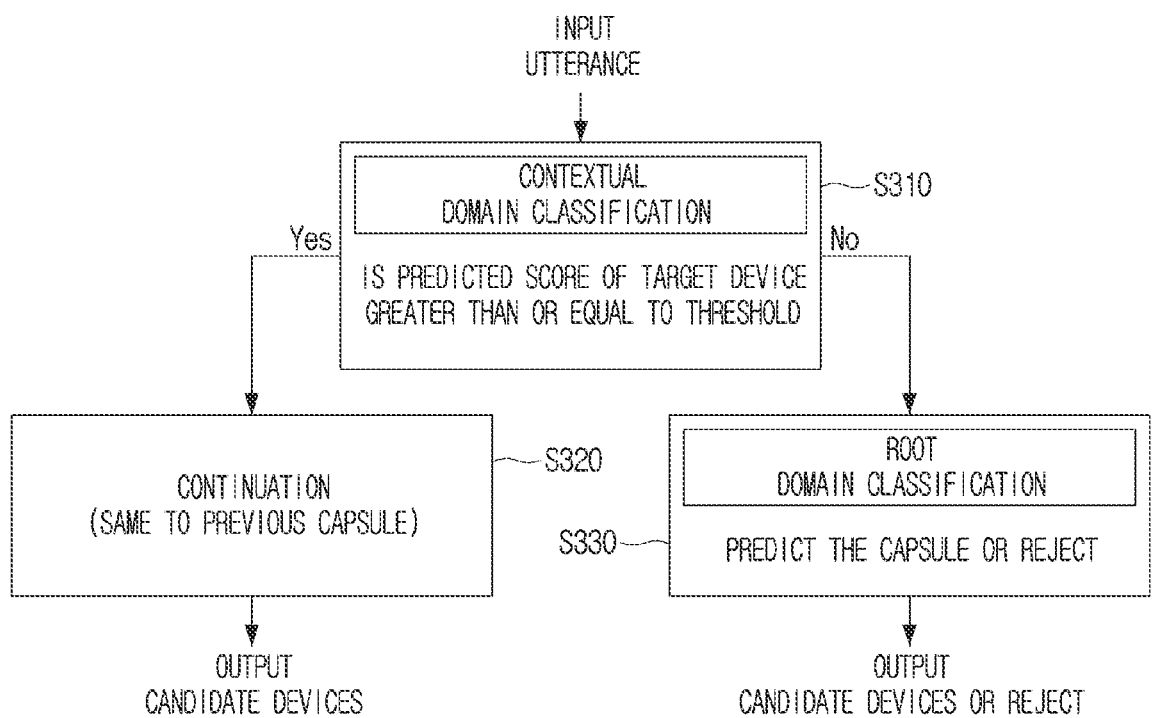

ELECTRONIC DEVICE, SYSTEM AND CONTROL METHOD THEREOF

CROSS-REFERENCE TO RELATED APPLICATIONS

This application is the U.S. national phase of International Application No. PCT/KR2021/006973 filed Jun. 3, 2021 which designated the U.S. and claims priority to Korean Application No. 10-2020-0150340 filed Nov. 11, 2020 and Korean Application No. 10-2021-0014058 filed Feb. 1, 2021, the entire contents of each of which are hereby incorporated by reference.

TECHNICAL FIELD

The disclosure relates to an electronic device, a system, and a control method thereof, and for example, to an electronic device recognizing and responding a user's voice regardless of a location of a user, a system, and a control method thereof.

BACKGROUND ART

Along with the development of electronic technologies, even typical electronic devices of the related art may recognize a user's voice to perform an operation or provide a response. For example, various electronic devices may be disposed in a room, a living room, a kitchen, and the like of a house and each electronic device may recognize a user's voice and perform an operation or provide a response.

If a user utters to one electronic device at a fixed location, the electronic device which has received voice data corresponding to the user's utterance may perform an operation or provide a response according to the user's utterance. However, there may be a problem, if the user performs a first utterance, moves to another place, and then performs a second utterance. For example, the user may perform the first utterance to a TV located in the living room, move to the kitchen, and then perform the second utterance to a refrigerator located in the kitchen. In this case, the refrigerator may not understand the second utterance or, although the refrigerator understands the second utterance, the refrigerator may not perform a suitable operation or provide a suitable response corresponding to the user's utterance.

Therefore, there are needs for a technology of continuously performing a suitable operation or providing a suitable response corresponding to the user's utterances, although user's utterances are input to different electronic devices.

DISCLOSURE

Technical Problem

Embodiments of the disclosure provide an electronic device for accurately recognizing a user's utterance and providing a response thereto through cooperation between a plurality of electronic devices, although user's continuous utterances may be input to different electronic devices, a system, and a control method thereof.

In accordance with an example embodiment of the disclosure, a method for controlling an electronic device is provided, the method including: receiving voice data corresponding to an input utterance, determining whether domain information and intent information are able to be extracted by analyzing the input utterance, based on at least one of the domain information and the intent information not being extracted as a result of the determination, broadcasting a signal requesting previous utterance related information to one or more external devices connected to a same network as the electronic device, receiving the previous utterance related information from the at least one external device, extracting the domain information and the intent information based on the received previous utterance related information and the input utterance, and obtaining and outputting a response result based on the extracted domain information and intent information.

In accordance with an example embodiment of the disclosure, an electronic device is provided, the electronic device including: a microphone configured to receive an input utterance, a communication interface comprising communication circuitry configured to communicate with an external device, a speaker, and a processor, wherein the processor is configured to control the electronic device to: determine whether domain information and intent information are able to be extracted by analyzing the input utterance, based on at least one of the domain information and the intent information not being extracted as a result of the determination, broadcast a signal requesting previous utterance related information to one or more external devices connected to a same network as the electronic device, control the communication interface to receive the previous utterance related information from the at least one external device, extract the domain information and the intent information based on the received previous utterance related information and the input utterance, and control the speaker to obtain and output a response result based on the extracted domain information and intent information.

In accordance with an example embodiment of the disclosure, a system is provided, the system including: a first electronic device configured to receive an input utterance, determine whether domain information and intent information are able to be extracted by analyzing the input utterance, based on at least one of the domain information and the intent information not being extracted, broadcast a signal requesting previous utterance related information to one or more external devices connected to a same network, and a second electronic device configured to: receive a signal requesting the previous utterance related information from the first electronic device, and transmit the previous utterance related information to the first electronic device, wherein the first electronic device is configured to: receive the previous utterance related information from at least one external device including the second electronic device, extract the domain information and the intent information based on the received previous utterance related information and the input utterance, and obtain and output a response result based on the extracted domain information and intent information.

DESCRIPTION OF DRAWINGS

The above and other aspects, features and advantages of certain embodiments of the present disclosure will be more apparent from the following detailed description, taken in conjunction with the accompanying drawings, in which:

FIG. 7B a diagram illustrating an example of translating the utterance according to various embodiments;

FIG. 9B is a diagram illustrating an example of determining whether an utterance is able to be processed on another electronic device according to various embodiments;

FIG. 10 is a diagram illustrating an example process of identifying a type of the utterance according to various embodiments.

MODE FOR INVENTION

Figure 1:
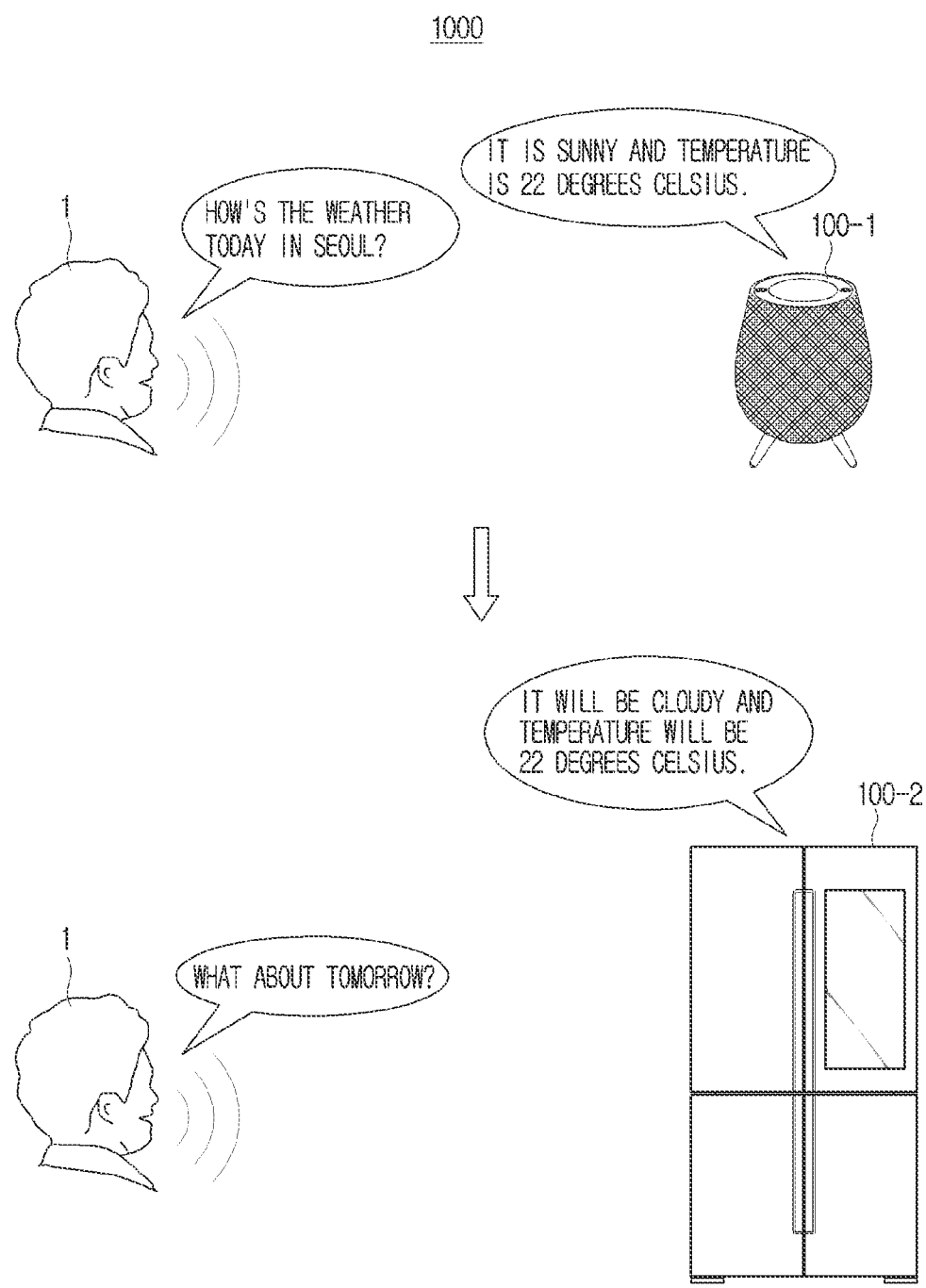
FIG. 1 is a diagram illustrating example operation of a system according to various embodiments.

Hereinafter, the disclosure will be described in greater detail with reference to the accompanying drawings. The embodiments disclosed herein may be variously changed. A specific embodiment may be illustrated in a drawing and described in detail in the disclosure. However, the specific embodiment disclosed in the accompanying drawing is merely for convenience of description and understanding of various embodiments. Accordingly, it should be understood that the technical spirit and scope of the disclosure is not limited to a specific embodiment disclosed in the accompanying drawings, and all equivalents or alternatives included in the disclosed spirit and technical scope of the disclosure are included.

The terms including ordinals such as "first" or "second" may be used for describing various components, but the components are not limited by the above terms. The above terms may be only used for distinguishing one component from another.

It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof. If it is described that a certain element is "connected to" or "coupled to" another element, it should be understood that the certain element may be connected to the other element directly or through still another element. On the other hand, if it is described that a certain element is "directly coupled to" or "directly connected to" another element, it may be understood that there is no element therebetween.

A "module" or a "unit" regarding an element used in the disclosure may perform at least one function or operation. In addition, the "module" or the "unit" may perform the function or the operation by hardware, software, or a combination of hardware and software. In addition, a plurality of "modules" or a plurality of "units", except for a "module" or a "unit" which should be performed in specific hardware or performed in at least one processor, may be integrated into one module. Unless otherwise defined, a singular expression may encompass a plural expression.

In describing the disclosure, it should be understood that the order of each step is not limited, unless a previous step should be performed before a subsequent step logically and in time. In other words, other than the above exceptions, the gist of the disclosure is not affected even if the process described as the subsequent step is performed before the process described as the previous step, and a scope of a right also should be defined regardless of the order of steps. In the specification, "A or B" does not only selectively indicate any one of A and B, but is defined to include both A and B. In addition, a term "including" in the disclosure may further include other elements, in addition to the listed elements.

In the disclosure, compulsory elements necessary for the description of the disclosure are described and elements with no relation with the gist of the disclosure may not be mentioned. It should not be interpreted as exclusive meaning of including only the mentioned elements, but should be interpreted as non-exclusive meaning of including other elements.

In addition, in the disclosure, a detailed description of the related art or configuration may be omitted when it is determined that the detailed description may unnecessarily obscure a gist of the disclosure. Each example embodiment may be implemented or operated independently or the embodiment may also be implemented or operated in combination.

FIG. 1 is a diagram illustrating example operation of a system according to various embodiments.

A system 1000 may include a plurality of electronic devices including a first electronic device 100-1 and a second electronic device 100-2. For example, the electronic device may include, for example, and without limitation, an AI speaker, a TV, a refrigerator, a washing machine, a microwave, an oven, an air conditioner, a smartphone, a table PC, a laptop computer, a desktop computer, and the like. The AI speaker, the TV, and the air conditioner may be located in a living room and the refrigerator, the microwave, and the oven may be located in a kitchen. The desktop computer may be located in a room and the washing machine may be located in a utility room. Each of the plurality of electronic devices may store its own information of the electronic device. In addition, each of the plurality of electronic devices may store information of external electronic devices located around electronic device. For example, if the refrigerator, the TV, and the AI speaker are located in the house, the refrigerator may store information of the refrigerator, information of the TV, and information of the AI speaker. In addition, the TV may store the information of the TV, the information of the refrigerator, and the information of the AI speaker, and the AI speaker may store the information of the AI speaker, the information of the refrigerator, and the information of the TV. The information of the electronic device may include information such as, for example, and without limitation, a device type, a device location, a domain, or the like. The domain may include an utterance processing element capable of processing the user's utterance. In an embodiment, the domain may be classified, for example, and without limitation, into a weather domain, a region information domain, a music domain, an image domain, and the like according to service. In addition, the domain may be classified, for example, and without limitation, into an application a, an application b, an application c, and the like according to the application. Further, the domain may be classified, for example, and without limitation, into a TV domain, a refrigerator domain, a speaker domain, and the like according to the device. The domain may, for example, be referred to as a capsule, a service category, and the like.

In an embodiment, the refrigerator may store information such as a refrigerator for the device type, a kitchen for the device location, and a refrigerator domain or a food related application domain for the domain, as its own information. In addition, the refrigerator may store information such as a speaker for the device type, a living room for the device location, a speaker domain, a search domain, a music domain, and the like for the domain as the device information of the AI speaker, and store information such as a TV for the device type, a living room for the device location, and a TV domain, an image domain, and the like for the domain as the device information of the TV. However, it will be understood that the information stored by the various devices is not limited to the examples listed above and may include various other information or less information.

The first electronic device 100-1 may receive a first utterance of a user 1. For example, the first electronic device 100-1 may receive an utterance "How's the weather today in Seoul?" The user's utterance may include a root utterance and/or a continuation utterance. The root utterance may refer, for example, to a first utterance for starting a task. In an embodiment, the root utterance may include, for example, an utterance "How's the weather today in Seoul?", "Execute program a", or the like.

The continuation utterance may refer, for example, to an utterance having relevance to a previous utterance. The continuation utterance may include a meta command utterance, a prompt utterance, a sequence utterance, or the like. The meta command utterance may refer, for example, to an utterance for performing a basic function regardless of the type of the electronic device. In an embodiment, the meta command utterance may include an utterance for instructing "the first one", "the second one", "cancel", "execute", and the like. The prompt utterance may refer, for example, to a user's response utterance for additional information requested by the device to perform the task. In an embodiment, if the user 1 firstly utters "How's the weather?" the electronic device may request additional information by "for which region?" The user 1 may respond "Seoul" and the response utterance "Seoul" may be prompt utterance. The sequence utterance may refer, for example, to, after one task is completed, an utterance requesting an additional task related to the one completed task. In an embodiment, with respect to a request of the user 1 "How's the weather today in Seoul?", the electronic device may output information on today's weather in Seoul as a voice. The user 1 may utter "What about tomorrow?" to the electronic device. The user's utterance "What about tomorrow?" is a request utterance for tomorrow's weather in Seoul which relates to the today's weather in Seoul that is requested previously. In this case, the request utterance "What about tomorrow?" is the sequence utterance.

As described above, the first electronic device 100-1 may search for today's weather in Seoul with respect to the input first utterance "How's the weather in Seoul?" and output weather information. The user 1 may move to another place (e.g., kitchen) after performing the first utterance for requesting the first electronic device 100-1 for the weather information. The user may listen the today's weather information in Seoul from the first electronic device 100-1 and perform a second utterance to the second electronic device 100-2. The second utterance of the user 1 may be the root utterance or the continuation utterance. Referring to FIG. 1, the user 1 may listen the response to the first utterance and perform the second utterance related to the first utterance to the second electronic device 100-2.

For example, the user 1 may perform the utterance "What about tomorrow?" to the second electronic device 100-2. The second electronic device 100-2 may receive the second utterance of the user 1. For example, the second electronic device 100-2 may receive the user's utterance. The first and second electronic devices 100-1 and 100-2 may store information of surrounding electronic devices. Each of the first and second electronic devices 100-1 and 100-2 may store utterance related information (e.g., dialogue state information) input thereto. The utterance related information may include, for example, and without limitation, a time stamp representing a processing time of the last user's utterance in the past, information related to an utterance task (e.g., idle, prompt, task completion, and the like), an utterance history, domain information related to the user's utterance, intent information related to the user's utterance, and the like.

The second electronic device 100-2 that has received the second utterance of the user 1 may identify whether the second utterance includes information on a target device. For example, the second utterance of the user 1 "What about tomorrow?" does not include the information on a target device. If the second utterance of the user 1 does not include the information on a target device, the second electronic device 100-2 may identify whether it is able to translate the second utterance based, for example, on the stored utterance related information, the domain information included in the utterance, and the intent information included in the utterance. For example, the second utterance of the user 1 "What about tomorrow?" does not include the information on the domain and the intent. If it is identified that the second utterance of the user 1 is unable to be translated, the second electronic device 100-2 may broadcast a signal requesting the utterance related information to a plurality of electronic devices. Each of the plurality of electronic devices which has received the signal requesting for the utterance related information may transmit the stored utterance related information to the second electronic device 100-2. An electronic device not having the utterance related information may ignore the request from the second electronic device 100-2.

The second electronic device 100-2 may receive the utterance related information from at least one external device among the plurality of electronic devices. The second electronic device 100-2 may identify a piece of utterance related information related to the second utterance among the received pieces of utterance related information according to a certain reference, and the electronic device. For example, the second electronic device 100-2 may identify utterance related information having the latest time stamp among the pieces of received utterance related information as the utterance related information related to the second utterance. For example, the utterance related information of the first electronic device 100-1 may include the latest time stamp. Accordingly, the utterance related information transmitted by the first electronic device 100-1 may be identified as the utterance related information related to the second utterance. The second electronic device 100-2 may identify the utterance related information considering location information of the electronic device. The first electronic device 100-1 which has transmitted the identified utterance related information may be identified as the target device.

In addition, the second electronic device 100-2 may identify whether the input second utterance is the root utterance or the continuation utterance based on the identified utterance related information. If the input second utterance is the continuation utterance and the identified utterance related information indicates a task completion state, the second electronic device 100-2 may identify the input second utterance as the sequence utterance. The second electronic device 100-2 may identify the first electronic device 100-1 to which the identified sequence utterance is to be transmitted. For example, the information related to the utterance task of the utterance related information received from the first electronic device 100-1 may indicate the task completion state. The task completion state may imply that a previous task exists and the previous task is a completed task. Accordingly, the second electronic device 100-2 may identify the second utterance as the continuation utterance. For example, since the previous task is the completed task, the second electronic device 100-2 may identify the second utterance as the sequence utterance among the continuation utterances. In addition, since the identified utterance related information is received from the first electronic device 100-1, the second electronic device 100-2 may identify the first electronic device 100-1 as the target device to which the identified sequence utterance is to be transmitted.

The second electronic device 100-2 may transmit the identified sequence utterance to the first electronic device 100-1. Since the first electronic device 100-1 stores the utterance state information related to the received second utterance, the first electronic device may process the second utterance. For example, the first utterance of the user 1 is "How's the weather today in Seoul?" and the second utterance is "What about tomorrow?" Accordingly, the first electronic device 100-1 may identify the second utterance as the utterance requesting for the information on the weather tomorrow in Seoul based on the stored utterance related information. The first electronic device 100-1 may search for the tomorrow's weather in Seoul. The first electronic device 100-1 may transmit a response signal to the tomorrow's weather in Seoul to the second electronic device 100-2. The second electronic device 100-2 may receive the response signal obtained by processing the sequence utterance by the first electronic device 100-1 and output the response signal as a voice.

In some examples, the second electronic device 100-2 may extract domain information and intent information of the second utterance based on the identified utterance related information and the input second utterance. If the extracted domain information is a domain that is able to be processed on the second electronic device 100-2, the second electronic device 100-2 may obtain a response result based on the extracted domain information and intent information and output the obtained response result as a voice.

Figure 2:
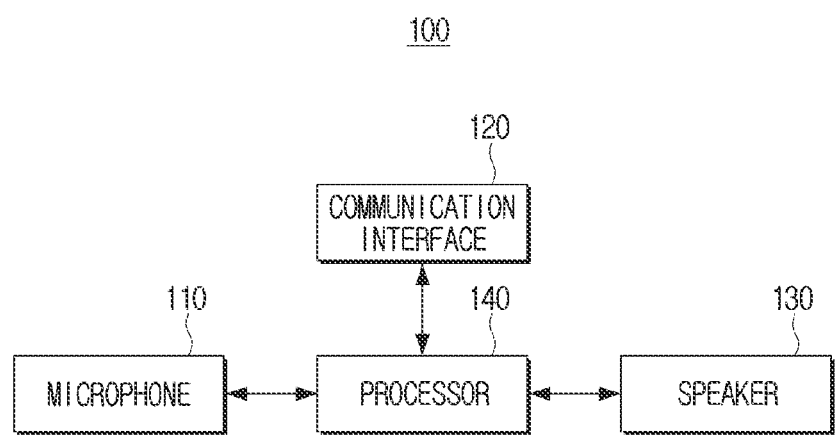
FIG. 2 is a block diagram illustrating an example configuration of an electronic device according to various embodiments.

FIG. 2 is a block diagram illustrating an example configuration of the electronic device according to various embodiments.

Referring to FIG. 2, the electronic device 100 may include a microphone 110, a communication interface (e.g., including communication circuitry) 120, a speaker 130, and a processor (e.g., including processing circuitry) 140.

The microphone 110 may receive the user's utterance. The communication interface 120 may communicate with an external device. The communication interface 120 may include various communication circuitry and transmit and receive information with the external device using wired and wireless communication methods. For example, the communication interface 120 may include modules capable of performing communication by methods such as 3G, Long Term Evolution (LTE), 5G, Wi-Fi, Bluetooth, and Local Area Network (LAN). In addition, the communication interface 120 may include a global positioning system (GPS). The communication interface 120 communicating with the external device may be referred to as a communicator, a communication unit, a communication module, a transceiver, and the like. The communication interface 120 may broadcast a signal requesting previous utterance related information to all external devices connected to the same network as the electronic device. In addition, previous utterance related information or a response result related to the user's utterance may be received from the external device. In an embodiment, the utterance related information may include a time stamp representing processing time of the user's last utterance in the past, information related to an utterance task (e.g., idle, prompt, task completion, and the like), an utterance history, domain information related to the user's utterance, intent information related to the user's utterance, and the like. In addition, the communication interface 120 may transmit the user's utterance input to a specific target device.

The speaker 130 may output a voice signal obtained by performing voice processing. In other words, the speaker 130 may output the response result obtained based on the input utterance or perform an operation related to the input utterance and output the result of the performed operation.

The processor 140 may include various processing circuitry and control each configuration of the electronic device 100. For example, the processor 140 may control the communication interface 120 to transmit and receive various pieces of information (or data). The processor 140 may control the microphone 110 to receive the user's utterance and control the speaker 130 to output the result related to the utterance.

The processor 140 may determine whether it is able to extract the domain information and the intent information by analyzing the input utterance. If at least one of the domain information and the intent information is not extracted, the processor 140 may broadcast the signal requesting for the previous utterance related information to surrounding electronic devices and control the communication interface to receive the previous utterance related information from the surrounding electronic devices. The processor 140 may extract the domain information and the intent information based on the received previous utterance related information and the input utterance, and control the speaker 130 to obtain and output the response result based on the extracted domain information and intent information.

The processor 140 may identify latest utterance related information based on the time stamp included in the previous utterance related information received form the external devices. The processor 140 may extract the domain information and the intent information based on the identified latest utterance related information. In addition, the processor 140 may identify whether the input utterance is the root utterance or the continuation utterance based on the identified latest utterance related information. For example, the continuation utterance may include, for example, and without limitation, a meta command utterance, a prompt utterance, a sequence utterance, or the like. If the input utterance is the meta command utterance or the prompt utterance, the processor 140 may control the speaker 130 to perform the corresponding operation based on the input utterance and output the response result of the operation. If the input utterance is the sequence utterance, the processor 140 may control the speaker 130 to obtain and output the response result based on the extracted domain information and intent information and the input utterance.

If the input utterance includes specific information, the processor 140 may perform the operation corresponding to the specific information. For example, if the input utterance includes name information of the target device, the processor 140 may control the communication interface 120 to transmit the input utterance to the target device. If the input utterance includes information on a location of the target device and information on the domain, the processor 140 may control the communication interface 120 to transmit the input utterance to one target device including the domain among target devices disposed at locations included in the utterance. In addition, if the extracted domain information is domain information that is unable to be processed by the electronic device 100, the processor 140 may control the communication interface 120 to transmit the input utterance to the target device which has transmitted the identified latest utterance related information.

Although not shown in FIG. 2, the electronic device 100 may include a memory (not illustrated). The memory may store data and the like for performing functions of the electronic device 100 and store programs, instructions, and the like executed on the electronic device 100. In addition, the memory may store information thereof and surrounding electronic devices, the utterance related information that is related to the user's utterance input to the electronic device 100, and the like. In addition, the memory may store a module for identifying and processing the user's utterance. For example, the module stored in the memory may include a device/domain dispatcher, a device classifier module, a domain classifier module, an intent classifier module, a history discovery module, a target device selector module, a domain, and the like. Each module stored in the memory may be loaded on the processor and identify and the process the user's utterance. In an embodiment, the memory may be implemented as a type of a ROM, a RAM, an HDD, an SSD, a memory card, or the like.

Figure 3:
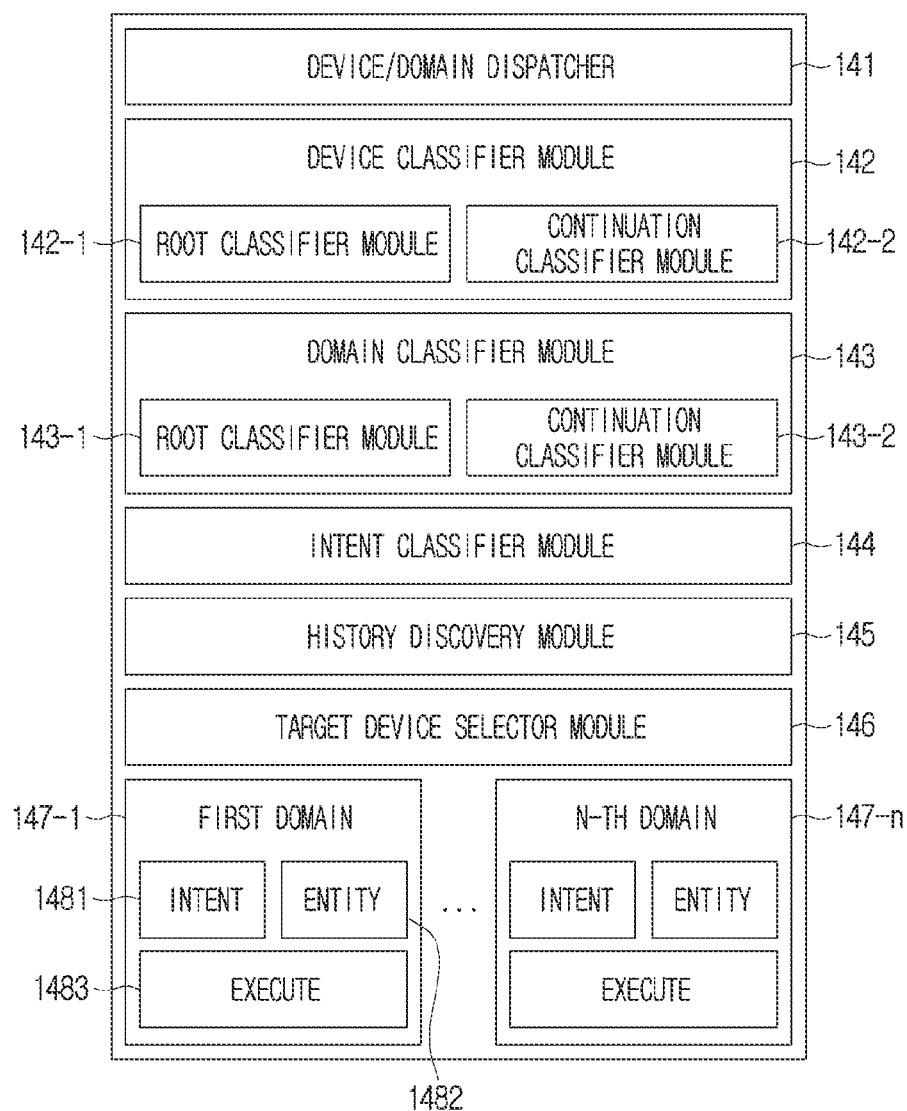
FIG. 3 is a diagram illustrating an example configuration of a processor according to various embodiments.

FIG. 3 is a diagram illustrating an example configuration of a processor according to various embodiments.

Referring to FIG. 3, the processor 140 may include a device/domain dispatcher (e.g., including processing circuitry and/or executable program elements) 141, a device classifier module (e.g., including processing circuitry and/or executable program elements) 142, a domain classifier module (e.g., including processing circuitry and/or executable program elements) 143, an intent classifier module (e.g., including processing circuitry and/or executable program elements) 144, a history discovery module (e.g., including processing circuitry and/or executable program elements) 145, a target device selector module (e.g., including processing circuitry and/or executable program elements) 146, domains 147-1 to 147-n, and the like.

The device/domain dispatcher 141 may include various processing circuitry and/or executable program elements and analyze the input user's utterance. For example, the device/domain dispatcher 141 may identify the electronic device type, the location information of the electronic device, the domain information, and the like from the input user's utterance.

The device classifier module 142 may include various processing circuitry and/or executable program elements and include a root classifier module 142-1 and a continuation classifier module 142-2. The device classifier module 142 may identify whether the input utterance is the root utterance or the continuation utterance based on the identified utterance related information. In addition, the device classifier module 142 may identify the electronic device that is able to translate the input utterance. For example, if the input utterance is the continuation utterance and the identified utterance information indicates the task completion state, the device classifier module 142 may identify the input utterance as the sequence utterance. The task completion state may imply that the previous task exists and the previous task is a completed task. Accordingly, the device classifier module 142 may identify that the input utterance is the sequence utterance among the continuation utterances. In addition, the device classifier module 142 may identify an external device to which the identified utterance related information is transmitted.

If the input utterance does not include the information on the target device, the domain classifier module 143 may identify whether it is able to translate the input utterance based on the stored utterance related information and the domain information included in the utterance. The domain classifier module 143 may include various processing circuitry and/or executable program elements and include a root classifier module 143-1 and a continuation classifier module 143-2. Accordingly, the domain classifier module 143 may identify whether the input utterance is the root utterance or the continuation utterance based on the stored utterance related information. For example, if the input utterance is the continuation utterance and the stored utterance related information indicates the task completion state, the domain classifier module 143 may identify the input utterance as the sequence utterance. The electronic device 100 may identify whether it is able to translate the input utterance using the intent classifier module 144 along with the domain classifier module 143.

The intent classifier module 144 may include various processing circuitry and/or executable program elements and identify whether it is able to translate the input utterance based on the intent information included in the input utterance. In other words, the electronic device 100 may identify whether it is able to translate the input utterance using the domain classifier module 143 and the intent classifier module 144.

For example, the user's utterance "What about tomorrow?" does not include the information on the domain and intent. If it is identified that it is unable to translate the input utterance, the electronic device 100 may broadcast the signal requesting for the previous utterance related information to a plurality of electronic devices.

The history discovery module 145 may include various processing circuitry and/or executable program elements and identify a piece of utterance related information related to the input utterance among the pieces of received utterance related information according to a certain reference. For example, the electronic device 100 may identify the utterance related information having the latest time stamp among the pieces of received utterance related information as the utterance related information that is related to the input utterance. For example, the utterance related information of the first electronic device may include the latest time stamp. Accordingly, the electronic device may identify the utterance related information transmitted by the first electronic device as the utterance related information that is related to the input utterance. In addition, the electronic device may identify the utterance related information by considering with the location information thereof.

The target device selector module 146 may include various processing circuitry and/or executable program elements and identify the first electronic device which has transmitted the identified utterance related information as the target device. Accordingly, if it is not necessary to transmit the input utterance, the electronic device 100 may transmit the input utterance to the first electronic device which is identified as the target device.

The electronic device 100 may process the input utterance by itself. The electronic device 100 may include a plurality of domains 147-1 to 147-n. If the electronic device 100 includes the domain 147-1 processing the input utterance, the electronic device 100 may identify intent and an entity from the input utterance based on the domain 147-1 for processing the input utterance, and output a response corresponding to the input utterance. The domain 147-1 may be an utterance processing element capable of processing the user's utterance. In an embodiment, the domain 147-1 may be classified as a weather domain, a region information domain, a music domain, an image domain, or the like according to the service. In addition, the domain 147-1 may be classified as an application a, an application b, an application c, and the like according to the application. Further, the domain 147-1 may be classified as a TV domain, a refrigerator domain, a speaker domain, and the like according to the device. The domain may be referred to, for example, as a capsule, a service category, and the like.

The domain 147-1 may include an intent identifier 1481, an entity extractor 1482, and an executor 1483. The intent identifier 1481 may include various processing circuitry and/or executable program elements and identify a service requested by the user (user's intent) and the entity extractor 1482 may include various processing circuitry and/or executable program elements and identify specific information of the service requested by the user (entity). In an embodiment, if the user utters "How's the weather today in Seoul?", the weather domain may process the utterance and respond. The electronic device 100 may obtain a word "weather" from the user's utterance. The intent identifier 1481 may identify that the user requests weather information. In addition, the electronic device 100 may obtain words "today" and "Seoul" from the user's utterance. The entity extractor 1482 may identify that the user requests information on today in terms of time and information on Seoul in terms of location. The above-mentioned intent may be referred to as a goal and the entity may be referred to as a slot or the like. The electronic device including the domain capable of processing the input utterance may identify the service on the intent identifier 1481, identify the specific information on the entity extractor 1482, and then output a response through the executor 1483. In an embodiment, the electronic device 100 may respond "It is sunny and the temperature is 22 degrees Celsius" in response to the user's utterance "How's weather today in Seoul?"

Hereinabove, an example configuration of the electronic device has been described. Hereinafter, an example process of operating of the electronic device will be described in greater detail.

Figure 4:
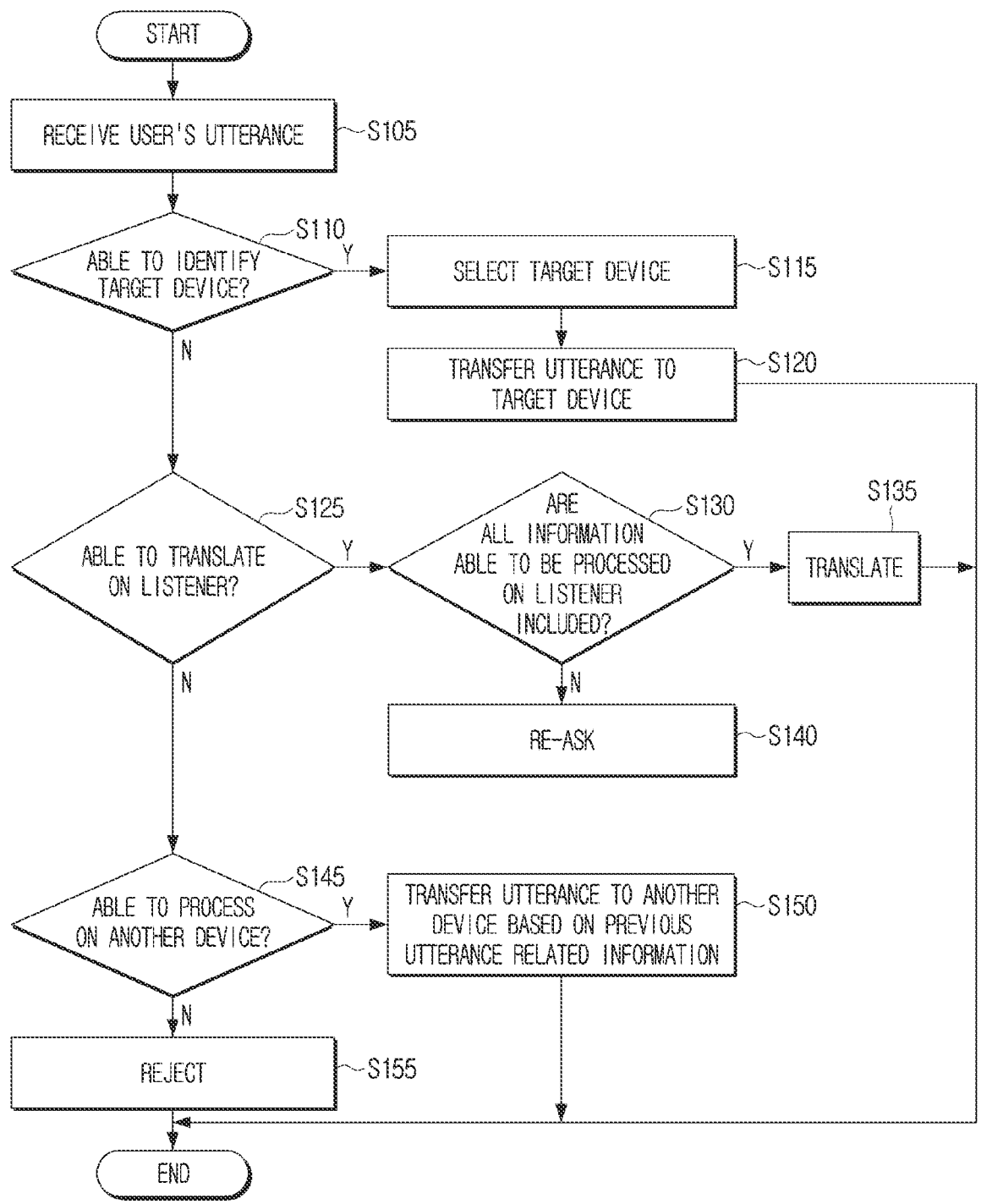
FIG. 4 is a flowchart illustrating an example operation of the electronic device according to various embodiments.
Figure 5:
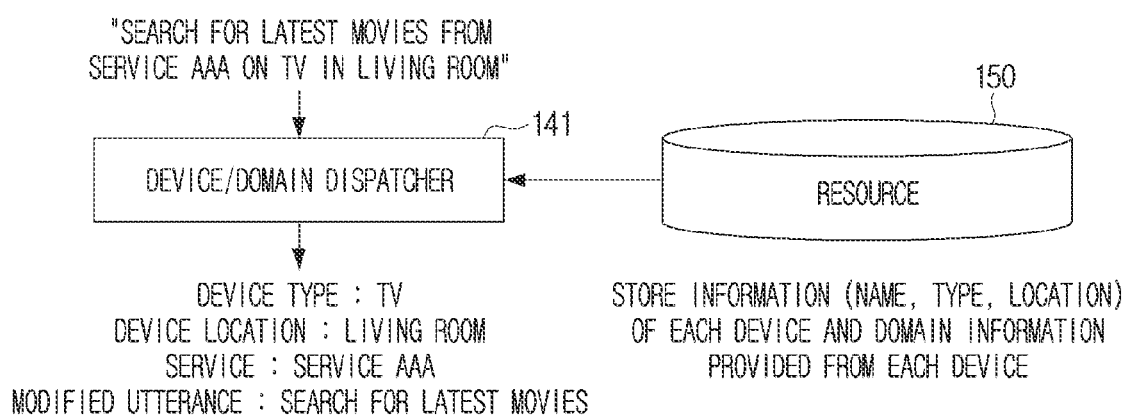
FIG. 5 is a diagram illustrating an example process of identifying a target device according to various embodiments.
Figure 6:
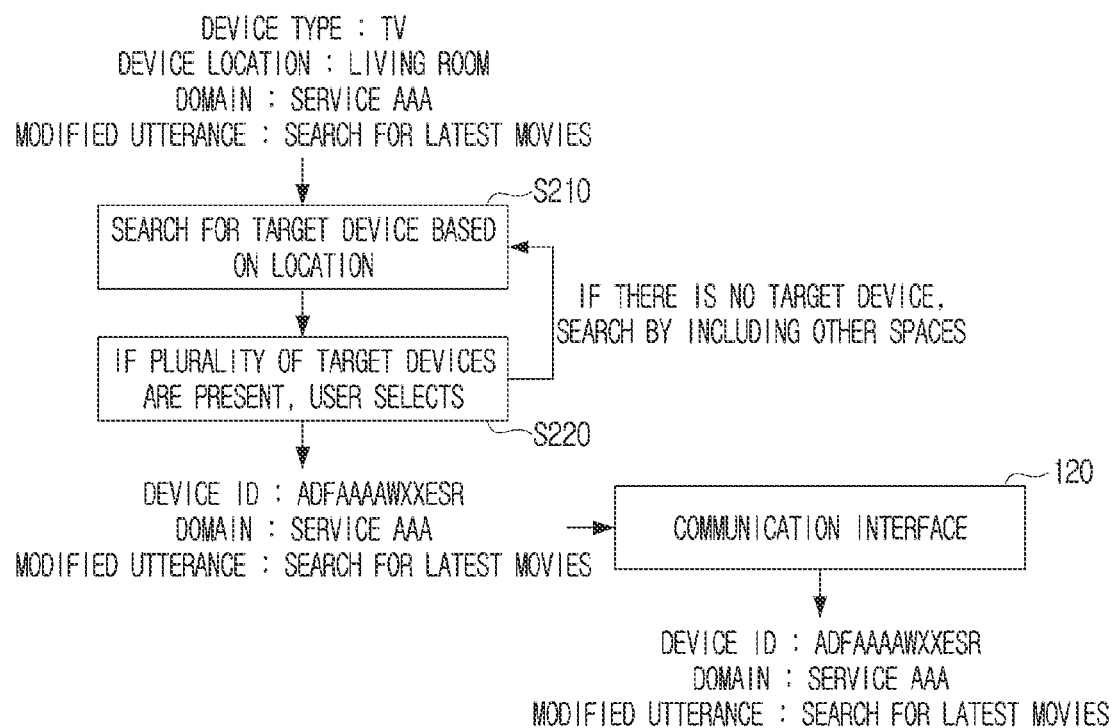
FIG. 6 is a diagram illustrating an example process of transferring an utterance to the target device according to various embodiments.
Figure 7A:
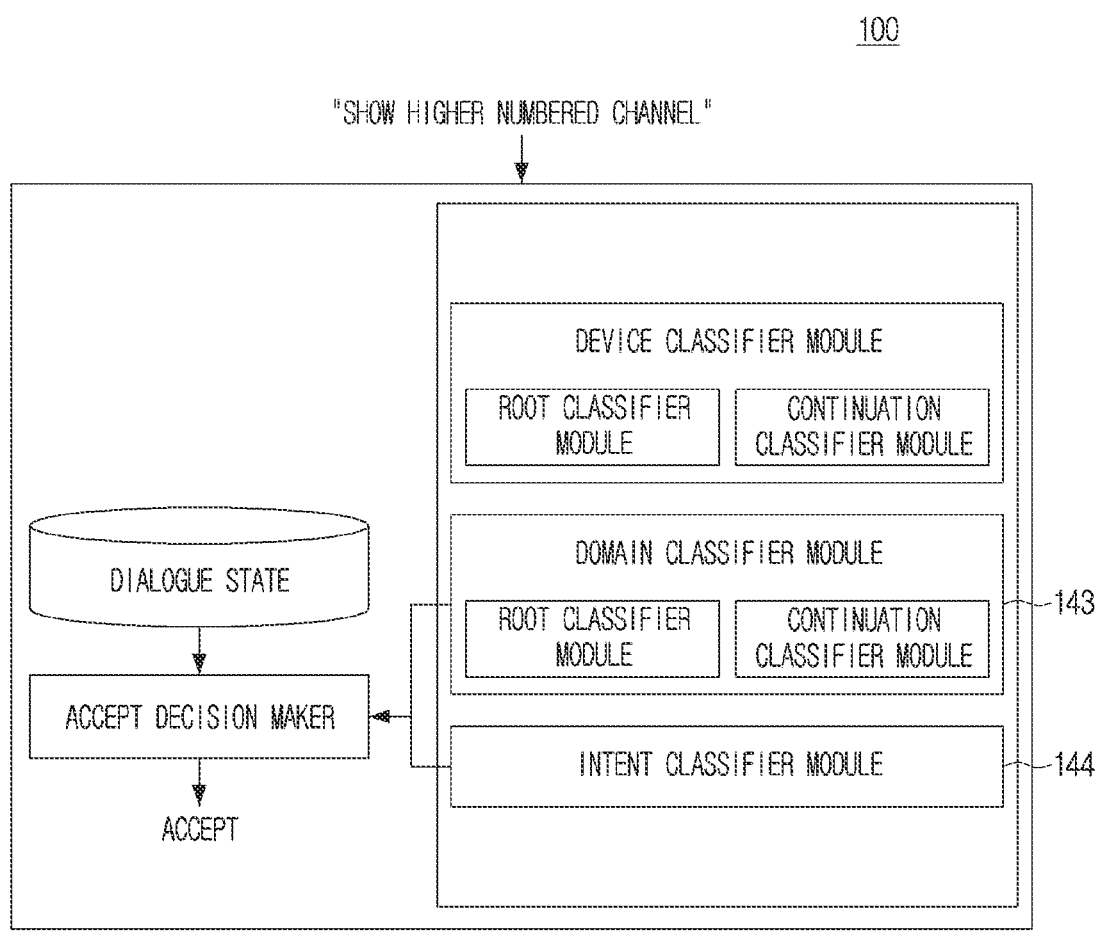
FIG. 7A is a diagram illustrating an example process in which the electronic device translates the utterance according to various embodiments.
Figure 8:
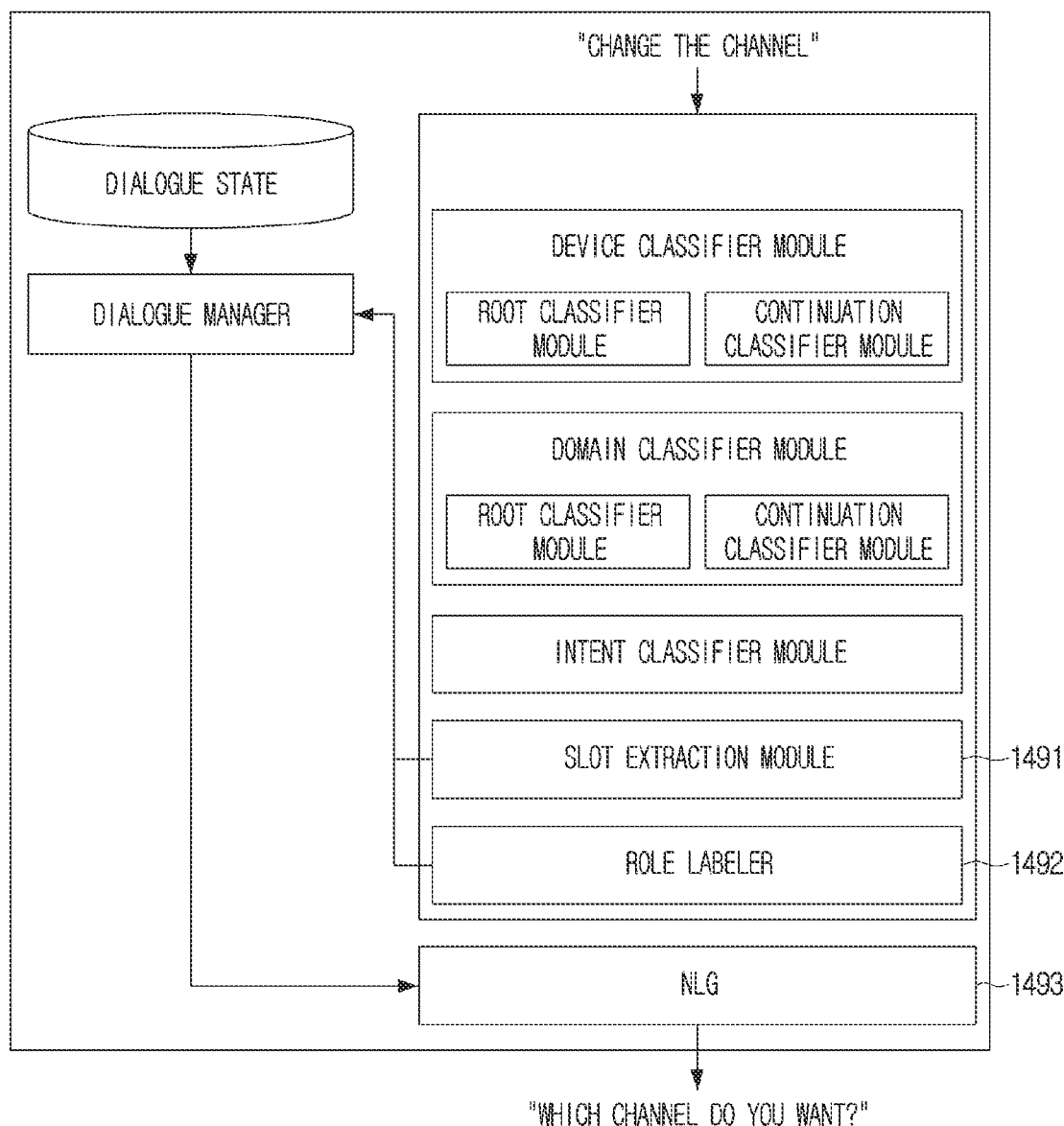
FIG. 8 is a diagram illustrating an example process of determining information included in the utterance according to various embodiments.
Figure 9A:
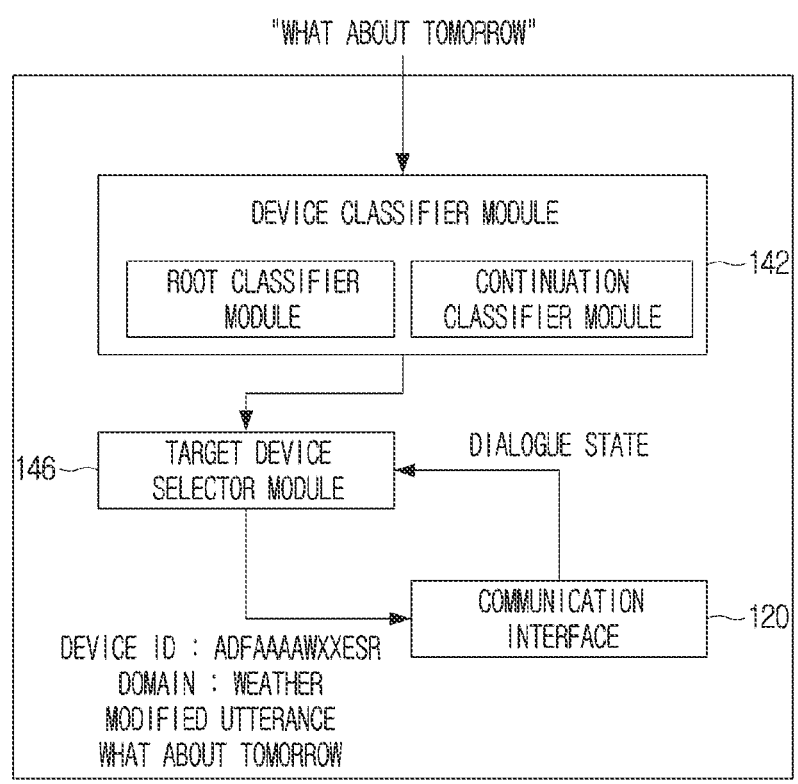
FIG. 9A is a diagram illustrating an example process of determining whether an utterance is able to be processed on another electronic device according to various embodiments.

FIG. 4 is a flowchart illustrating example operation of the electronic device according to various embodiments, FIG. 5 is a diagram illustrating an example process of identifying a target device according to various embodiments, FIG. 6 is a diagram illustrating an example process of transferring utterance to the target device according to various embodiments, FIGS. 7A and 7B are diagrams illustrating an example process in which the electronic device translates an utterance according to various embodiments, FIG. 8 is a diagram illustrating an example process of determining information included in the utterance according to various embodiments, and FIGS. 9A and 9B are diagrams illustrating an example process of determining whether an utterance is able to be processed on another electronic device according to various embodiments. The following description will be made with reference to FIGS. 4 to 9B.

Referring to FIG. 4, the electronic device may receive the user's utterance (S105). The electronic device may identify a target device based on the user's utterance (S110). As illustrated in FIG. 5, the electronic device may receive the user's utterance "Search for latest movie from the service AAA on TV in living room". The device/domain dispatcher 141 of the electronic device may analyze the input user's utterance. The electronic device may store information of each device and domain information provided from each device in a memory 150. The device/domain dispatcher 141 of the electronic device may analyze that the type of the electronic device is the TV, the location of the electronic device is the living room, the service is the service AAA, and the user's utterance is the latest movie search, from the input user's utterance based on the stored information and input utterance. In other words, the electronic device may identify the TV located in the living room as the target device.

If the electronic device is able to identify the target device ("Y" in S110), the electronic device may select the target device (S115). The electronic device may transfer the input utterance to the selected target device (S120). As illustrated in FIG. 6, the electronic device may search for the target device based on the location based on the analyzed information (S210). If a plurality of target devices are present in the same space, the electronic device may select one target device according to the user's selection (S220). If there is no target device at the analyzed location, the electronic device may search again for the target device by including other spaces. If the target device is searched, the electronic device may transmit the user's utterance (or utterance related information) to the target device via the communication interface 120.

If the electronic device is not able to identify the target device ("N" in S110), the electronic device may determine whether it is able to analyze the utterance on an electronic device (listener) to which the utterance is input (S125). As illustrated in FIG. 7A, the electronic device may determine whether it is able to translate the input utterance using the domain classifier module 143 and the intent classifier module 144. Referring to FIG. 7B, if it is determined that the domain of the input utterance is rejected (unable to be selected, unable to be classified) and the information related to the utterance task indicates idle or task completion based on the stored utterance related information, the electronic device may determine that the input utterance is an utterance that is not able to be translated (reject). Although it is determined that the domain of the input utterance is accepted, if it is determined that the intent is rejected and the information related to the utterance task is idle and task completion, the electronic device may determine the input utterance is an utterance that is not able to be translated (reject).

If the electronic device is able to translate the input utterance ("Y" at S125), the electronic device may determine whether the input utterance includes all information (S130). As illustrated in FIG. 8, the electronic device may determine using a slot extraction module (or entity extraction module) 1491 and a role labeler 1492. The slot extraction module 1491 may include various processing circuitry and/or executable program elements and perform the same role as the entity extractor. The role labeler 1492 may include various processing circuitry and/or executable program elements and identify the structure and meaning of the input utterance. For example, the role labeler 1492 may identify a target, a tool, a location, time, a method, a reason, and the like from the input utterance. The electronic device may determine whether the input utterance includes all information for processing the input utterance based on the stored utterance related information (or information related to the utterance task).

If the input utterance includes all information ("Y" in S130), the electronic device may translate the input utterance and obtain and output the response result (S135). If the input utterance does not include all information ("N" in S130), the electronic device may perform re-asking to the user (S140). Referring to FIG. 8, if the input utterance is "Change the channel", the electronic device may determine that information on which channel to change to is insufficient. In this case, the electronic device may inquire of the user for additional information through a natural language generation (NLG) 1493 (e.g., including various processing circuitry and/or executable program elements) expressing a processing result in a natural language.

If the electronic device is not able to translate the input utterance ("N" in S125), the electronic device may determine whether it is able to process the input utterance on another device (S145). As illustrated in FIG. 9A, the electronic device may determine whether it is able to process the input utterance on another device using the device classifier module 142. In other words, the electronic device may receive the previous utterance related information from an external electronic device. In addition, the electronic device may identify the latest utterance related information among the received previous utterance related information. As illustrated in FIG. 9B, the electronic device may determine whether it is able to process the input utterance on another device based on the device classifier module 142 and the identified utterance related information.

If the input utterance is processed on another device ("Y" in S145), the electronic device may transmit the input utterance to another device (S150). In other words, the electronic device may select a target device using the target device selector module 146. In addition, the electronic device may transmit the input utterance (or input utterance related information) to the target device via the communication interface 120. The target device which has received the input utterance from the electronic device may process the input utterance, obtain the response result, and output the response result as a voice. The target device may transmit the obtained response result to the electronic device and the electronic device may output the received response result as a voice. If the input utterance is unable to be processed on another device ("N" in S145), the electronic device may reject the response to the input utterance (S155).

FIG. 10 is a diagram illustrating an example process of identifying a type of the utterance according to various embodiments.

Referring to FIG. 10, the device classifier module may receive an utterance. The device classifier module may be trained using a pattern-based classifier and various methods such as an artificial neural network method. The device classifier module may compare a predicted score of the target device with a threshold value (S310). If the predicted score is greater than (or equal to) the threshold value ("Yes" in S310), the device classifier module may determine the continuation utterance (same as previous domain) (S320). The device classifier module may identify the input utterance as the continuation utterance and output candidate target devices. If the predicted score is less than the threshold value ("No" in S310), the device classifier module may identify the input utterance as the root utterance (S330). The device classifier module may predict the domain or determine whether it is rejected, and output the result.

Hereinabove, various example embodiments of various configurations and the operation processes of the electronic device have been described. Hereinafter, a method for controlling the electronic device will be described in greater detail with reference to FIG. 11.

Figure 11:
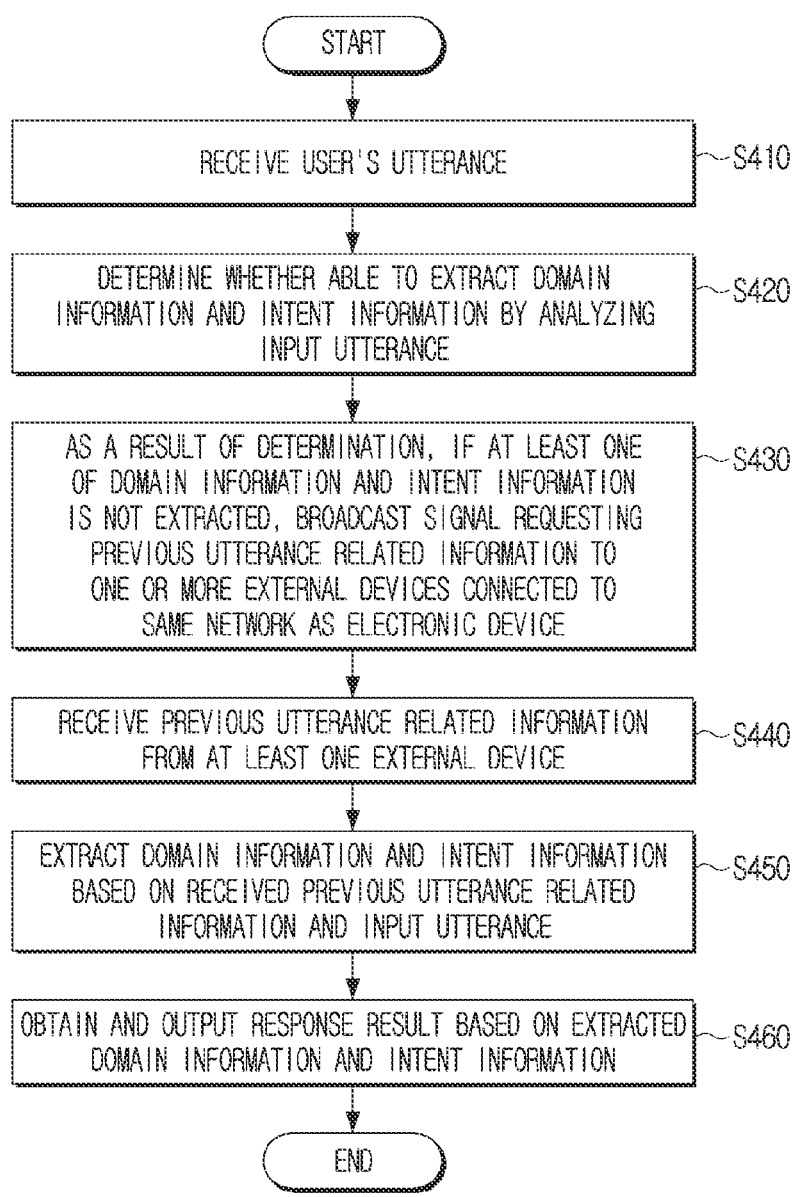
FIG. 11 is a flowchart illustrating an example method of controlling the electronic device according to various embodiments.

FIG. 11 is a flowchart illustrating an example method of controlling the electronic device according to various embodiments.

Referring to FIG. 11, the electronic device may receive the user's utterance (S410), analyze the input utterance and determine whether it is able to extract the domain information and the intent information (S420). If at least one of the domain information and the intent information is not extracted, the electronic device may broadcast the signal requesting for the previous utterance related information to one or more external devices connected to the same network as the electronic device (S430). If the input utterance includes name information of the target device, the electronic device may transmit the input utterance to the target device. If the input utterance includes the information on the location and the information on the domain of the target device, the electronic device may transmit the input utterance to one target device including the domain among the target devices located at the location.

The electronic device may receive the previous utterance related information from the at least one external device (S440), and extract the domain information and the intent information based on the received previous utterance related information and the input utterance (S450). The electronic device may identify the latest utterance related information based on the time stamp included in the previous utterance related information received from the at least one external device. The electronic device may extract the domain information and the intent information based on the identified latest utterance related information. The electronic device may identify whether the input utterance is the root utterance or the continuation utterance based on the identified latest utterance related information. In an embodiment, the continuation utterance may include a meta command utterance, a prompt utterance, or a sequence utterance.

If the extracted domain information is not domain information to be processed on the electronic device, the electronic device may transmit the input utterance to the target device which has transmitted the identified latest utterance related information.

The electronic device may obtain and output the response result based on the extracted domain information and intent information (S460). For example, if the input utterance is the meta command utterance or the prompt utterance, the electronic device may perform a corresponding operation based on the input utterance and output the response result of the operation. If the input utterance is the sequence utterance, the electronic device may obtain and output the response result based on the extracted domain information and intent information and the input utterance.

The method for controlling the electronic device according to the various example embodiments may be provided as a computer program product. The computer program product may include an S/W program or a non-transitory computer readable medium storing the S/W program.

The non-transitory computer-readable medium may refer to a medium that semi-permanently stores data and is readable by a machine. For example, the various applications or programs described above may be stored and provided in the non-transitory computer-readable medium such as a CD, a DVD, a hard disk drive, a Blu-ray disc, a USB, a memory card, and a ROM.

While the disclosure has been illustrated and described with reference to various example embodiments, it will be understood that the various example embodiments are intended to be illustrative, not limiting. It will be further understood by those skilled in the art that various modifications can be made, without departing from the true spirit and full scope of the disclosure, including the appended claims and their equivalents.

What is claimed is:

1. A method for controlling an electronic device, the method comprising:
   receiving an input utterance;
   determining whether domain information and intent information are able to be extracted by analyzing the input utterance;
   based on at least one of the domain information and the intent information not being extracted as a result of the determination, broadcasting a signal requesting previous utterance related information to one or more external devices connected to a same network as the electronic device;
   receiving the previous utterance related information from the at least one external device;
   extracting the domain information and the intent information based on the received previous utterance related information and the input utterance; and
   obtaining and outputting a response result based on the extracted domain information and intent information.

2. The method according to claim 1, wherein, based on the input utterance including name information of a target device, transmitting the input utterance to the target device.

3. The method according to claim 1, wherein, based on the input utterance including information on a location and information on a domain of a target device, transmitting the input utterance to a target device including the domain among target devices disposed at the location.

4. The method according to claim 1, wherein the extracting the domain information and the intent information comprises: identifying latest utterance related information based on a time stamp included in the previous utterance related information received from the at least one external device, and extracting the domain information and the intent information based on the identified latest utterance related information.

5. The method according to claim 4, further comprising:
   identifying whether the input utterance is a root utterance or a continuation utterance based on the identified latest utterance related information.

6. The method according to claim 5, wherein the continuation utterance includes at least one of a meta command utterance, a prompt utterance, or a sequence utterance.

7. The method according to claim 5, wherein the outputting comprises, based on the input utterance being a meta command utterance or a prompt utterance, performing a corresponding operation based on the input utterance and outputting a response result of the operation.

8. The method according to claim 5, wherein the outputting comprises, based on the input utterance being a sequence utterance, obtaining and outputting a response result based on the extracted domain information and intent information and the input utterance.

9. The method according to claim 4, further comprising:
   based on the extracted domain information not being domain information to be processed on the electronic device, transmitting the input utterance to a target device to which the identified latest utterance related information is transmitted.

10. An electronic device comprising:
    a microphone configured to receive an input utterance;
    a communication interface comprising communication circuitry configured to communicate with an external device;
    a speaker; and
    a processor,
    wherein the processor is configured to control the electronic device to:
    determine whether domain information and intent information are able to be extracted by analyzing the input utterance;
    based on at least one of the domain information and the intent information not being extracted as a result of the determination, broadcast a signal requesting previous utterance related information to one or more external devices connected to a same network as the electronic device, and control the communication interface to receive the previous utterance related information from the at least one external device;
    extract the domain information and the intent information based on the received previous utterance related information and the input utterance; and
    control the speaker to obtain and output a response result based on the extracted domain information and intent information.

11. The electronic device according to claim 10, wherein the processor is configured to control the electronic device to, based on the input utterance including name information of a target device, control the communication interface to transmit the input utterance to the target device.

12. The electronic device according to claim 10, wherein the processor is configured to control the electronic device to, based on the input utterance including information on a location and information on a domain of a target device, control the communication interface to transmit the input utterance to one target device including the domain among target devices disposed at the location.

13. The electronic device according to claim 10, wherein the processor is configured to control the electronic device to: identify latest utterance related information based on a time stamp included in the previous utterance related information received from the at least one external device, and extract the domain information and the intent information based on the identified latest utterance related information.

14. The electronic device according to claim 13, wherein the processor is configured to control the electronic device to identify whether the input utterance is a root utterance or a continuation utterance based on the identified latest utterance related information.

15. A system comprising:
    a first electronic device configured to: receive an input utterance, determine whether domain information and intent information are able to be extracted by analyzing the input utterance, based on at least one of the domain information and the intent information not extracted being, broadcast a signal requesting for previous utterance related information to one or more external devices connected to a same network; and
    a second electronic device configured to: receive a signal requesting the previous utterance related information from the first electronic device, and transmit the previous utterance related information to the first electronic device, wherein the first electronic device is configured to: receive the previous utterance related information from at least one external device including the second electronic device, extract the domain information and the intent information based on the received previous utterance related information and the input utterance, and obtain and output a response result based on the extracted domain information and intent information.

\* \* \* \* \*